United States Patent [19]

Ohkita et al.

[11] Patent Number: 4,803,576
[45] Date of Patent: Feb. 7, 1989

[54] DISC DRIVING DEVICE

[75] Inventors: Masao Ohkita; Shinichi Ohmori, both of Furukawa, Japan

[73] Assignee: Alps Electric Co., Ltd., Japan

[21] Appl. No.: 88,694

[22] Filed: Aug. 21, 1987

[30] Foreign Application Priority Data

Nov. 5, 1986 [JP] Japan .......................... 61-168991[U]

[51] Int. Cl.$^4$ ...................... G11B 5/012; G11B 5/016
[52] U.S. Cl. .................. 360/99.08; 360/99.06; 369/266; 358/906
[58] Field of Search ............................ 360/99, 97, 98

[56] References Cited

U.S. PATENT DOCUMENTS

| 4,306,259 | 12/1981 | Saito et al. | 360/99 |
| 4,466,032 | 8/1984 | Saito | 360/99 |
| 4,680,655 | 7/1987 | Sugawara | 360/97 |
| 4,737,870 | 4/1988 | Okita | 360/97 |

FOREIGN PATENT DOCUMENTS 60-263367 12/1985 Japan ................................. 360/97
61-246984 11/1986 Japan ................................. 360/98

Primary Examiner—Robert S. Tupper
Assistant Examiner—Matthew J. Bussan
Attorney, Agent, or Firm—Guy W. Shoup; Paul J. Winters

[57] ABSTRACT

A disk driving device which can be reduced in production cost and in overall thickness and can prevent a circuit board from being damaged upon ejection of a disk cartridge therefrom. The disk driving device comprises a spindle shaft mounted for rotation relative to a base by means of a metal bearing, a spindle fitted at an end of the spindle shaft remote from the base and having carried thereon a turntable for receiving a disk for integral rotation, a stator yoke secured to the base, and a buffer member mounted on a face of a driving magnet opposing to a circuit board mounted on the base. The driving magnet secured to the spindle for electromagnetically cooperating with a driving coil secured to the circuit board to rotate the spindle is located between the circuit board and the stator yoke.

5 Claims, 2 Drawing Sheets

DISC DRIVING DEVICE

BACKGROUND OF THE INVENTION

1. Field of the Invention

This invention relates to a device for driving a disk suitable for use with a magnetic recording and/or reproducing apparatus of a very small size such as a still video floppy disk apparatus which is installed within an electronic still camera.

2. Prior Art

FIG. 2 is a plan view of a disk cartridge for use with a magnetic recording and/or reproducing apparatus of the type mentioned, and FIG. 3 is a vertical sectional view of a typical one of conventional disk driving devices of the direct drive type with the disk cartridge of FIG. 2 loaded therein.

Referring to FIGS. 2 and 3, a cartridge case of a disk cartridge shown includes an upper case 1a and a lower case 1b both made of a hard synthetic resin material, and a flexible magnetic disk 2 is accommodated for rotation within the cartridge case 1. A window hole 3 is perforated at a predetermined position of each of the upper and lower cases 1a, 1b and is opened and closed by means of a shutter 4 having a channel-shaped cross section and fitted for sliding movement in the cartridge case 1.

A center hub 5 made of a synthetic resin material is mounted at the center of rotation of the magnetic disk 2 such that it may rotate around the center of openings 6 formed in the upper and lower cases 1a, 1b. The center hub 5 has a fitting hole 7 formed therein for receiving an outer race of an upper ball bearing of a magnetic recording and/or reproducing apparatus hereinafter described, and an elastic portion 5a having a reduced thickness of material is formed on the center hub 5 adjacent the fitting hole 7. The center hub 5 of the structure described above is molded in an integral relationship with a ring-shaped attracting yoke 8 to which the magnetic disc 2 is adhered, thereby establishing an integrated relationship among the magnetic disk 2, the center hub 5 and the attracting yoke 8, as seen in FIG. 3.

The disk cartridge having such a general construction as described above is loaded on a driving device of a magnetic recording and/or reproducing apparatus as shown in FIG. 3. Thus, the magnetic disk 2 within the disk cartridge is rotated by a driving force transmitted from a drive motor incorporated in the driving device.

In particular, referring to FIG. 3, a fixed shaft 10 is press fitted into and secured to a base 9, and a turntable 14 is supported for rotation on the fixed shaft 10 by means of an upper ball bearing 11 and a lower ball bearing 12. A flywheel 23 is securely mounted on the turntable 14. A ring-shaped driving magnet 15 is mounted on a lower face of the flywheel 23, and a driving coil 17 is mounted in an opposing relationship to the driving magnet 15 on the base 9. The turntable 14, flywheel 23, driving magnet 15 and driving coil 17 cooperatively constitute a drive motor for rotating the turntable 14 around the fixed shaft 10.

Meanwhile, a rotor yoke 18 is secured to a lower end of the turntable 14, and a ring-shaped FG magnet 19 is mounted on a lower face of the rotor yoke 18. A frequency signal generating board (hereinafter referred to as "FG board") 20 is mounted on an upper face of the base 9 in an opposing relationship to the FG magnet 19 such that, when the FG magnet 19 rotates relative to the FG board 20, a back electromotive force may be generated in the FG board 20 and extracted therefrom as a frequency signal. The frequency signal may be used to control rotation of the drive motor described above.

A ring-shaped control wall 14a is provided at an upper end of the turntable 14, and a ring-shaped attracting magnet 21 is fitted in the control wall 14a. The attracting magnet 21 acts to attract thereto the attracting yoke 8 integrated with the magnetic disk 2 described above. By the attracting force, the attracting yoke 8 is placed on and secured to the control wall 14a of the turntable 14 to allow the magnetic disk 2 to be integrally rotated by the turntable 14. A guide member 22 is secured to the top end of the fixed shaft 10 and has an upwardly conical tapered face 22a formed thereon.

If such a disk cartridge as described above is loaded into the magnetic recording and/or reproducing apparatus in which the driving device described above is incorporated, the shutter 4 which normally closes the window holes 3 is moved to open the window holes 3 by a projection not shown provided at a suitable location of the magnetic recording and/or reproducing apparatus so that part of the magnetic disk 2 is exposed from the window holes 3. Then, if the disk cartridge is lowered in this condition toward the driving device, the cartridge case 1 is positioned to a predetermined position by means of positioning pins not shown. Meanwhile, the magnetic disk 2 within the cartridge 1 is guided by the tapered face 22a of the guide member 22 and fitted around the outer race 11a of the upper ball bearing 11 while the attracting yoke 8 is attracted to the attracting magnet 21 and is placed on and secured to the turntable 14. In this instance, the center hub 5 is centered relative to the fixed shaft 10 by three portions of an inner wall of the fitting hole 7 thereof which contact with the outer race 11a of the upper ball bearing 11 due to an elastic force of the elastic portion 5a of the center hub 5 while the attracting yoke 8 is positioned in an axial direction of the fixed shaft by a lower face thereof which contacts with the top end of the control wall 14a of the turntable 14, thereby positioning the magnetic disk 2 in position.

Accordingly, if drive current is supplied from a driver circuit not shown to the driving coil 17 to drive the turntable 14 to rotate, the magnetic disk 2 is rotated in an integral relationship with and by the turntable 14 so that desired video signals may be recorded on or reproduced from the magnetic disk 2 by means of a magnetic head not shown which extends through one of the openings 3 of the cartridge case 1 and contacts with the rotating magnetic disk 2.

However, the conventional disk driving device described above has a drawback that its production cost is high because it requires such expensive ball bearings as the ball bearings 11, 12.

The applicant of the present patent application has already proposed, in Japanese Utility Model Application No. 61-119818, such a disk driving device as shown in FIG. 4. General construction of the proposed arrangement will be described below.

Referring to FIG. 4, a cylindrical bush 30 is press fitted into and secured to a base 9, and a spindle shaft 33 made of stainless steel is supported for rotation by means of a pair of metal bearings 31, 32 securely fitted in upper and lower portions of the bush 30. The spindle shaft 33 is finished spherical at a lower end face thereof at which it contacts with an abutting plate 34. A spindle 35 is securely mounted around an upper end portion of the spindle shaft 33 and has an upwardly conical tapered face 35a formed thereon. The spindle 35 is processed for hardening. A bowl-shaped turntable 14, a similarly bowl-shaped flywheel 23 and a substantially cylindrical spacer 36 are fitted around and secured to the spindle 35 in this order below the tapered face 35a. A ring-shaped attracting magnet 21 is securely fitted in the turntable 14, and a ring-shaped driving magnet 15 is adhered to a lower face of the flywheel 23.

Meanwhile, a printed circuit board 37 is secured to the base 9, and a driving coil 17 is adhered in an opposing relationship to the driving magnet 15 to an upper face of the printed circuit board 37 inside a dust cover 40 secured to the printed circuit board 37. A stator yoke 38 is adhered to a poriton of the base 9 below the driving coil 17, and a rotor yoke 39 is interposed between the stator yoke 38 and the driving coil 17 and secured to the spacer 36.

In the disk driving device having the construction described above, if a disk cartridge is loaded in position and then driving current is supplied from a driver circuit not shown to the driving coil 17 to rotate the turntable 14 together with the spindle shaft 33, the magnetic disk within the disk cartridge is rotated in an integral relationship with the turntable 14 so that desired video signals may be recorded on or reproduced from the magnetic disk by a magnetic head not shown. Here, since the spindle shaft 33 which serves as a rotary shaft for the turntable 14 is subject to some thrust load due to a magnetic attracting force between the stator yoke 38 and the rotor yoke 39 and is positioned in radial directions by the upper and lower metal bearings 31, 32, there is no fear of deflection in rotation of the turntable 14. Further, with the construction of the disk driving device as described above, an inexpensive metal bearing can be used in place of an expensive ball bearing, and accordingly the production cost of the disk driving device can be reduced significantly.

However, the proposed arrangement shown in FIG. 4 also presents a problem. In particular, since the thrust load applied to the spindle shaft 33 is low relative to a magnetic attracting force between the attracting yoke integrated with the disk and the attracting magnet 21, there is the possibility that, when the disk cartridge is to be ejected, the rotor of the disk driving device, that is, the turntable 14, driving magnet 15, rotor yoke 39 and so on, may be moved by an upward thrust direction until the rotor yoke 39 which may be rotating due to its own inertia and inertia of the members connected thereto is contacted with the printed circuit board 37 and possibly scrapes a rear face of the printed circuit board 37 to produce shavings in the form of powder which will have a bad influence on the drive motor and the magnetic disk. Particularly where a pattern of an FG coil and so on is formed on the reverse face of the printed circuit board 37, there is also the possibility that the pattern may be cut. It is to be noted that if the thrust load to be applied to the spindle shaft 33 is set to a high degree, the rotational performance of the rotor of the disk driving device will be deteriorated remarkably, and accordingly this is not preferable.

Further, while it is demanded lately to reduce the overall thickness of a still video floppy disk apparatus, the arrangements shown in FIGS. 3 and 4 cannot remarkably be reduced in overall thickness on account of their individual structures.

SUMMARY OF THE INVENTION

It is an object of the present invention to provide a disk driving device which can be reduced in production cost and in overall thickness and can prevent a circuit board from being damaged upon ejection of a disk cartridge therefrom.

In order to attain the object, according to the present invention, there is provided a disk driving device, comprising a fixed base, a metal bearing secured to said base, a spindle shaft mounted for rotation relative to said base by means of said metal bearing, a spindle fitted at an end portion of said spindle shaft remote frome said base, a turntable secured to said spindle for receiving a disk for integral rotation therewith, a circuit board securely mounted on said base, a driving coil secured to said circuit board, a driving magnet secured to said spindle for electromagnetically cooperating with said driving coil to rotate said spindle, a stator yoke secured to said base, said driving magnet being located between said circuit board and said stator yoke, and a buffer member mounted on a face of said driving magnet opposing to said circuit board.

According to the disk driving device, since the driving magnet which is located, in the case of the conventional disk driving device described above, remote from the base with respect to the driving coil is located between the circuit board and the stator yoke, the necessity of a rotor yoke can be eliminated. Further, since the spindle shaft undergoes some thrust load produced by a magnetic attracting force between the driving magnet and the stator yoke and is positioned in radial directions by the metal bearing, there is no necessity of provision of an expensive ball bearing. Further, since the buffer member will contact with the printed circuit board when a disk cartridge is to be ejected from the disk driving device, there is no fear that the printed circuit board may be damaged.

The above and other objects, features and advantages of the present invention will become apparent from the following description and the appended claims, taken in conjunction with the accompanying drawings.

DETAILED DESCRITPION OF THE PREFERRED EMBODIMENT

Figure 1:
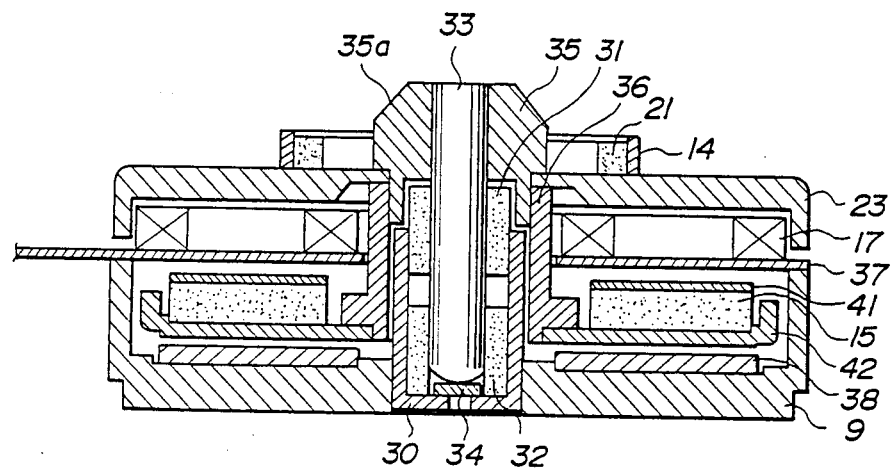
FIG. 1 is a vertical sectional view of a disk driving device according to an embodiment of the present invention.
Figure 2:
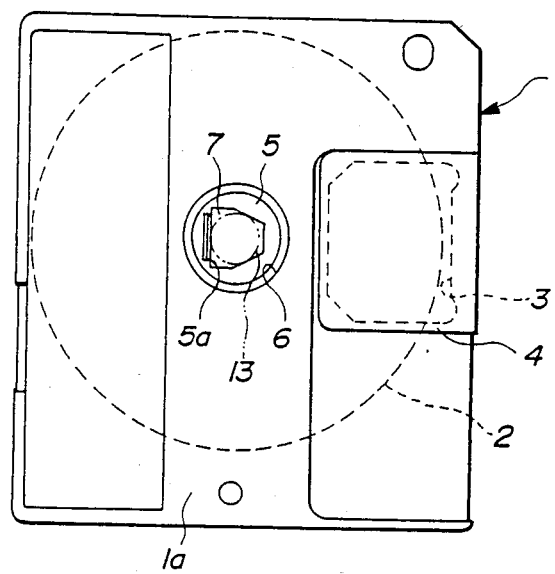
FIG. 2 is a plan view of a disk cartridge.
Figure 3:
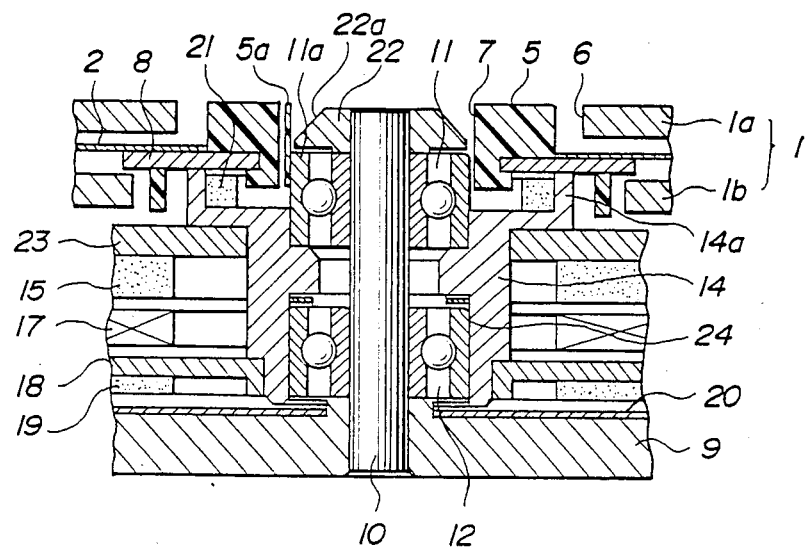
FIG. 3 is a vertical sectional view of essential part of an exemplary one of conventional disk driving devices.

Referring to FIG. 1, there is shown in vertical section a disk driving device according to the present invention. The disk driving device has a similar construction to that of the disk driving device of FIG. 4, and like parts or components are denoted like reference numerals to those of FIG. 4. Thus, the disk driving device of FIG. 1 additionally includes a buffer member 41 made of a rubber plate, and a frame 42 in the form of a circular bowl.

In the disk driving device of to FIG. 1, a cylindrical bush 30 is press fitted into and secured to a base 9, and a spindle shaft 33 made of stainless steel is supported for rotation by means of a pair of metal bearings 31, 32 securely fitted in upper and lower portions of the bush 30. The spindle shaft 33 is finished spherical at a lower end face thereof at which it contacts with an abutting plate 34 secured to an inner bottom face of the bush 30. A spindle 35 is securely mounted around an upper end portion of the spindle shaft 33 and has an upwardly conical tapered face 35a formed thereon. The spindle 35 is processed for hardening. A bowl-shaped turntable 14, a similarly bowl-shaped flywheel 23 and a substantially cylindrical spacer 36 are fitted around and secured to the spindle 35 in this order below the tapered face 35a. A ring-shaped attracting magnet 21 is securely fitted in the turntable 14.

Meanwhile, a printed circuit board 37 on which a driver circuit, a control circuit and so on are formed by printing is secured to an upper end of a cylindrical portion of the base 9, and a driving coil 17 is adhered to an upper face of the printed circuit board 37 and is thus accommodated in an annular spacing defined by the printed circuit board 37, a lower face of the fly wheel 23 and a cylindrical portion of the flywheel 23 which extends downwardly toward the cylindrical portion of the base 9 with a little gap left between a lower end thereof and an opposing upper face of the printed circuit board 37. Meanwhile, a driving magnet 15 is accommodated in another annular spacing defined by the printed circuit board 37, an upper face and the cylindrical portion of the base 9 and is located in an opposing relationship to the driving spool 17 via the printed circuit board 37. The buffer member 41 made of a rubber plate is applied to an upper face of the driving magnet 15 which in turn is placed on and secured to the bowl-shaped frame 42 fitted on and secured to the spacer 36. It is to be noted that an FG coil not shown is printed on a rear face of the printed circuit board 37, that is, a face of the printed circuit board 37 opposing to the buffer member 41. Further, a stator yoke 38 is secured to a portion of the upper face of the base 9 below the driving coil 15, that is, a portion of the base 9 opposing to the driving magnet 15 via the frame 42.

In the disk driving device having the general construction described above, when a disk cartridge is to be loaded in position, the fitting hole of the center hub of the magnetic disk in the disk cartridge is guided by the tapered face 35a of the spindle 35 and fitted around and centered relative to the spindle 35. Meanwhile, the attracting yoke integral with the center hub is attracted to the attracting magnet 21. Consequently, the magnetic disk is plated on and secured at a predetermined position on the turntable 14.

Accordingly, if driving current is supplied in this condition from a driver circuit not shown to the driving coil 17 to rotate the turntable 14 together with the spindle shaft 33, the magnetic disk within the disk cartridge is rotated in an integral relationship with the turntable 14 so that desired video signals may be recorded on or reproduced from the magnetic disk by a magnetic head not shown. Here, since the spindle shaft 33 which serves as a rotary shaft for the turntable 14 is subject to some thrust load due to a magnetic attracting force between the stator yoke 38 and the driving magnet 15 and is positioned in radial directions by the upper and lower metal bearings 31, 32, there is no fear of deflection in rotation of the turntable 14.

Then, when the disk cartirdge is to be ejected, the rotor of the disk driving device is moved by an upwardly directed force in FIG. 1 by a magnetic attracting force between the attracting yoke integrated with the magnetic disk and the attracting magnet 21. In this case, however, the driving magnet 15 which is rotating due to its own inertia and inertia of the members connected thereto is contacted with a rear face of the printed circuit board 37 via the buffer member 41. Accordingly, there is no fear that the printed circuit board 37 may be scraped nor the FG coil may cut by the driving magnet 15. The buffer member 41 additionally has, due to its frictional force with the printed circuit board 37, a braking function to prevent unnecessary rotation of the driving magnet 15, that is, the rotor, upon ejecting of the disk cartridge.

Figure 4:
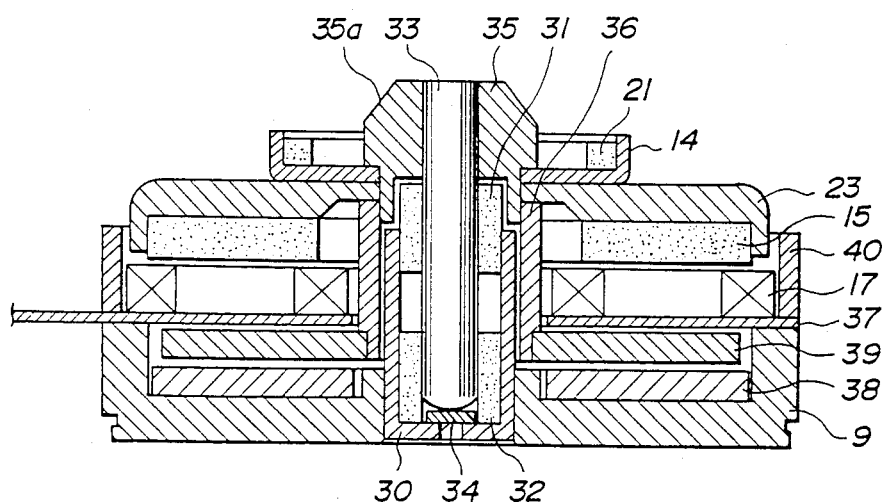
FIG. 4 is a similar view but showing another conventional disk driving device.

In the disk driving device of the embodiment described above, the driving magnet 15 which is located, in the case of the conventional disk driving device of FIG. 4, on the opposite side to the base 9 with respect to the driving coil 17 is located between the circuit board 37 and the stator yoke 38. Consequently, the necessity of a rotor yoke is eliminated. Accordingly, the disk driving device can be reduced in overall thickness and also in number of parts thereof. Besides, since the spindle shaft 33 serving as a rotary shaft for the turntable 14 undergoes some thrust load produced by a magnetic attracting force between the driving magnet 15 and the stator yoke 38 and is positioned in radial directions by the metal bearings 31, 32, there is no necessity of provision of an expensive ball bearing, and accordingly the cost of the disk driving device can be reduced. Further, since the buffer member 41 will contact with the rear face of the printed circuit board 37 as described hereinabove when the disk cartridge is to be ejected from the disk driving device, there is no fear that the printed circuit board 37 may be scraped nor the FG coil not shown may be cut. In addition, since the flywheel 23 itself covers the driving coil 17 and a cover which corresponds to a dust cover such as the dust cover 40 of FIG. 4 incorporated in a conventional disk driving device is omitted in the disk driving device of the embodiment, the flywheel 23 can be designed to have a comparatively large outer diameter, which may allow the torque of the driving motor to be increased.

As apparent from the foregoing description, according to the present invention, various effects can be anticipated. In particular, a rotor yoke of a disk driving device can be omitted, and accordingly the disk driving device can be reduced in overall thickness and also in number of parts. Further, an inexpensive metal bearing can be used in place of an expensive ball bearing, which allows the disk driving device to be produced at a reduced production cost. In addition, possible damage to a circuit board upon ejecting operation of a disk cartridge can be prevented by a buffer member.

Having now fully described the invention, it will be apparent to one of ordinary skill in the art that may changes and modifications can be made thereto without departing from the spirit and scope of the invention as set forth herein.

What is claimed is:

1. A disk driving device, comprising a fixed base, a metal bearing secured to said base, a spindle shaft mounted for rotation relative to said base by means of said metal bearing, a spindle fitted at an end portion of said spindle shaft remote from said base, a turntable secured to said spindle for receiving a disk for integral rotation therewith, a circuit board securely mounted on said base, a driving coil secured to said circuit board, a driving magnet secured to said spindle for electromagnetically cooperating with said driving coil to rotate said spindle, a stator yoke secured to said base, said driving magnet being located between said circuit board and said stator yoke, and a buffer member mounted on a face of said driving magnet opposing to said circuit board.

2. A disc driving device according to claim 1, wherein said base has a cylindrical portion, and said circuit board is mounted at ane end of said cylindrical portion of said base thereby to define a substantially closed spacing in which said driving magnet is accommodated.

3. A disc driving device according to claim 1, further comprising a flywheel secured to said spindle for rotation therewith, said flywheel having a cylindrical portion extending toward said circuit board on said base with a little gap left therebetween to thereby define a spacing in which said driving coil on said circuit board is accommodated.

4. A disk driving device according to claim 1, further comprising a frame member secured to said spindle by means of a cylindrical member and having said driving magnet secured thereto.

5. A disk driving device according to claim 1, wherein said buffer member is a rubber plate applied to the face of said driving magnet.

* * * * *